Figure 1:
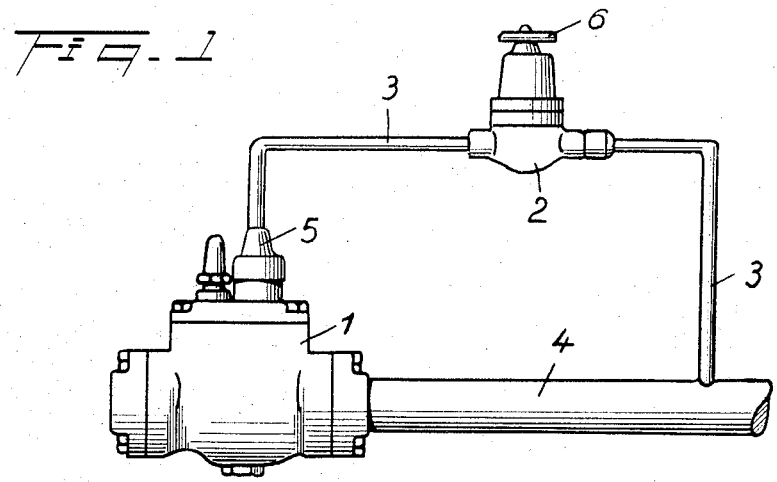

May 5, 1959   P. C. MATTHIESEN   2,884,951
PILOT-CONTROLLED REGULATING VALVE
Filed March 12, 1957   2 Sheets-Sheet 1

United States Patent Office 2,884,951
Patented May 5, 1959

2,884,951

PILOT-CONTROLLED REGULATING VALVE

Peter Christian Matthiesen, Elsmark, Nordborg, Als, Denmark, assignor to Danfoss ved ingenior Mads Clausen, Elsmark, Nordborg, Denmark, a Danish firm Application March 12, 1957, Serial No. 645,438

Claims priority, application Germany December 24, 1956

3 Claims. (Cl. 137—489.5)

The invention relates to pilot controlled regulating valves and more particularly to regulating valves for use in refrigerator plants in connection with the suction piping thereof. The invention relates to regulating valves of the kind having a servo-piston which is mechanically connected to a valve plate for opening and closing the main flow passage of the regulating valve, in conjunction with a pressure equalizing nozzle and a feed line for the suction pressure from the inlet side of the regulating valve.

Pilot-controlled regulating valves of the aforesaid kind are known, but they have the drawback that they provide unstable regulation whenever a relatively large pressure differential exists between the inlet side and the discharge side of the valve, also when the valve is only partially open. In both cases the known valves may oscillate and fail to provide stable, constant regulation.

This drawback is eliminated in a regulating valve according to the invention. A feature of the regulating valve is that the valve plate thereof is provided with a cylindrical extension on the closing surface thereof projecting into a seat sleeve of the regulating valve. The cylindrical extension is of such a diameter that an annular space formed between the inner side of the seat sleeve and the outer periphery of the cylindrical extension has a radial dimension less than or equal to the axial length of the cylindrical extension.

The result obtained is a suitable restriction of the flow through the flow passage of the regulating valve during the initial movement of the servo-piston and the valve plate, which renders the regulating valve less apt to oscillate during the initial opening movement of the valve plate.

In one embodiment of the valve according to the invention the cylindrical extension ends in a truncated portion having its smallest diameter furthest removed from the valve plate.

The beneficial result obtained by the cylindrical projection is that the restriction of the main fluid passageway of the regulating valve gradually decreases after the servo-piston completes the initial part of its movement. Thus, the flow passage of the valve is fully unrestricted when the critical interval in which oscillation is liable to occur has passed during the opening movement of the valve.

In a preferred embodiment of the valve according to the invention there is inserted a one-way valve member between the servo-piston and the inlet pipe to which the regulating valve is connected. This valve member is adapted to provide access to the inlet pipe only when the suction or inlet pressure has attained a predetermined value.

The result obtained by the one-way valve member is that the regulating valve will be still less apt to oscillate, even at very small flow openings and moreover at very low pressure differentials betwen the inlet and discharge sides of the regulating valve.

In an embodiment of the valve according to the invention that is very suitable in practice the said member consists of an easily movable laminated leaf spring one side surface of which normally rests against the mouth of an equalizing line connected to the regulating valve.

As a result, the said leaf valve member need only have a very small dimension in the axial direction of the valve, whereby the clearance space of the valve above the servo-piston may be kept of small dimensions, and in practice this has also been found to render the regulating valve less apt to oscillate.

Figure 2:
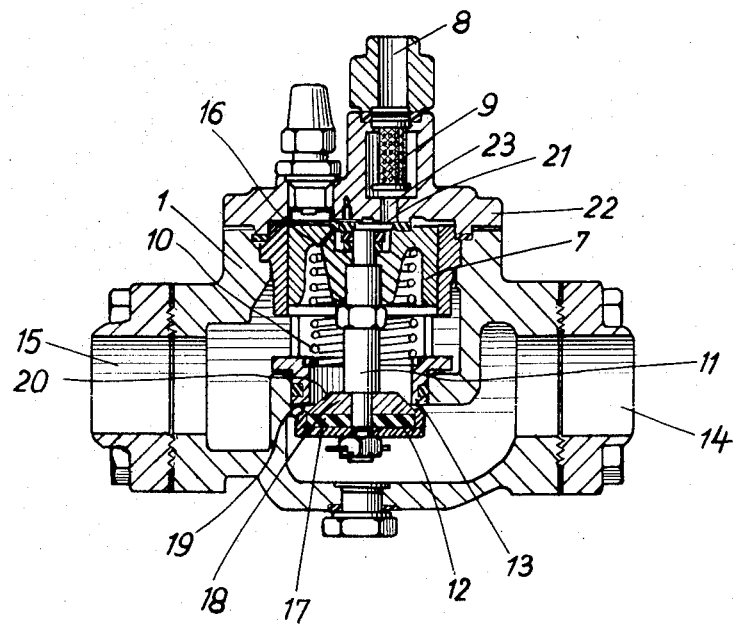
Figure 3:
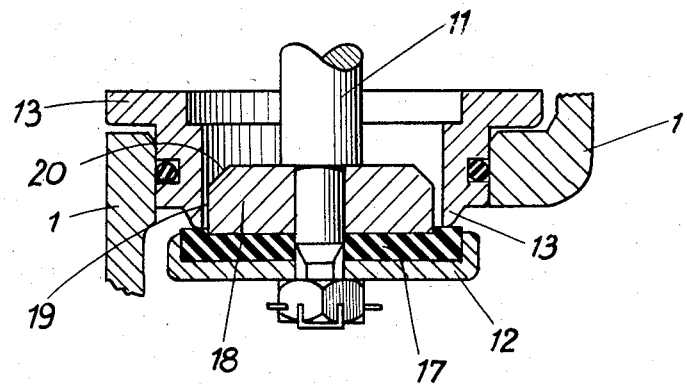
Figure 4:
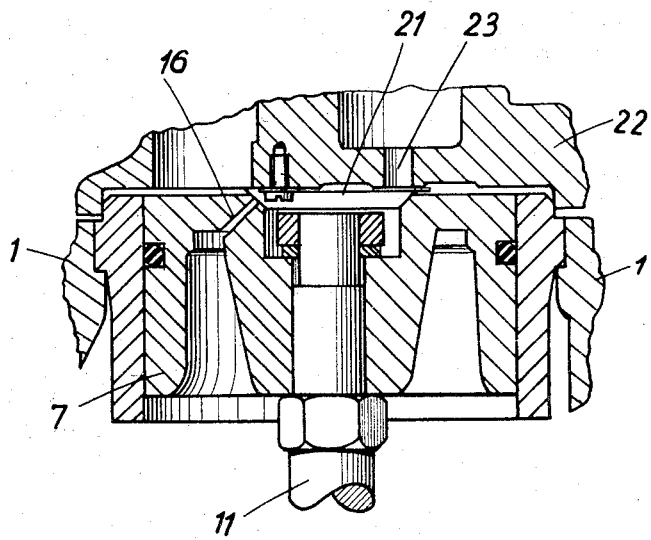

The invention will now be further described with reference to the drawing, in which:

Fig. 1 is a view illustrating a pilot-controlled regulating valve according to the invention connected to act in combination with a pilot valve, Fig. 2 is a median sectional view of the regulating valve shown in Fig. 1, Fig. 3 is a fragmentary view on an enlarged scale of a detail of the regulating valve shown in Fig. 2 illustrating the construction of the valve plate according to the invention, Fig. 4 is a fragmentary view on an enlarged scale of the valve shown in Fig. 2.

The drawing shows a regulating valve 1 for controlling the suction pressure, and consequently the temperature, of refrigerator plants (not shown) having preferably more than one vaporiser. The regulating valve 1 is used in connection with a spring-loaded pilot valve 2 which is inserted in a pressure equalizing line 3 between the suction line 4 of the plant from the vaporiser (not shown) and the upper part or bonnet 5 of the regulating valve. The pilot-control valve 2 and the regulating valve 1 act in the combination shown as a constant pressure valve, that is to say, they will at any given time tend to keep the temperature of evaporation at a desired fixed value which may be adjusted by turning a handle 6 of the spring-loaded pilot valve 2. So long as the pressure in the vaporiser is down at the desired value, both the regulating valve 1 and the pilot valve 2 are closed. If, on the contrary, the pressure rises, for instance, due to heat transmitted to the vaporiser, the pilot valve 2 opens and pressure is applied to a servo-piston 7 of the regulating valve through a feed passage 8 to which the equalizing pipe or line 3 is connected, and through a filter 9 to the upper side of the servo-piston 7, which is thereby forced downwardly. The servo-piston 7, which is constantly subjected to the action of a spring 10 urging it in the direction toward the top of the regulating valve, is connected to spindle 11 which is mechanically connected to a valve plate 12 of the regulating valve which is kept closed by the action of the spring. The valve plate rests against a seat sleeve 13 when in a valve closing position and on the downward movement of the servo-piston the plate 12 unseats so that the regulating valve os opened to allow fluid to flow between the inlet side 14 of the regulating valve through sleeve 13 and out the outlet side 15. When the pressure in the vaporiser consequently decreases the spring-loaded pilot valve closes and the pressure against the servo-piston 7 escapes through an equalizing nozzle 16 in the top of the servo-piston, whereby the regulating valve 1 closes sufficiently to re-establish balance between the gas pressure of the refrigerator plant and the spring pressure of the spring 10. The regulating valve 1 closes completely when the pressure at which the pilot valve is adjusted has been attained.

It will be understood that the spring-loaded pilot valve may be replaced by a thermostatically or electrically operated valve without the operation of the regulating valve being changed in principle.

The valve plate 12 may be provided with a sealing plate 17, and according to the invention it is furthermore provided with a cylindrical extension 18 on the closing surface of the valve plate 12 and projecting into the seat sleeve 13 of the regulating valve. The cylindrical projection 18 is of such a diameter that an annular space 19 formed between the inner periphery of the seat sleeve 13 and the outer periphery of the cylindrical projection 18 has a radial dimension less than or equal to the axial length of the cylindrical projection 18. As a result the main flow passage of the regulating valve is restricted during the initial part of the movement of the servo-piston 7 and the valve plate 12. This restriction has been found to reduce the tendency of the valve to oscillate. In accordance with the invention the cylindrical projection 18 may end in an upper truncated part 20 whose smallest diameter is furthest removed from the valve plate 12. By selecting a suitable top angle or bevel for the truncated part 20 the main passage of the regulating valve may be determined as a function of the movement of the valve plate, and thereby it is also possible to determine the amount of the displacement of the valve plate at which the valve is to have a fully unrestricted flow. While the aforesaid measures have been found effective in reducing the tendency of the valve to oscillate at great pressure differential between the inlet pressure at opening 14 and the outlet pressure at opening 15 in connection with small flow areas in the valve special provision must be made in order to avoid oscillations at very low pressure differentials between the inlet opening and the outlet opening.

In one embodiment of the regulating valve according to the invention a one-way valve member 21 is inserted between the servo-piston 7 and the inlet passage 8, adapted to allow fluid flow through passage 8 only when the suction pressure has attained a predetermined value. This prevents a reaction coupling of the mechanical oscillation of the servo-piston through the pressure equalizing line 3. It has been found of great importance for counteracting the tendency of the valve to oscillate that the clearance space between the upper side of the servo-piston 7 and the bonnet 22 of the valve be kept as small as possible in order to avoid fluctuating gas pressures in this space. In a preferred embodiment of the regulating valve according to the invention the member 21 consists of an easily movable laminated leaf spring whose one side surface rests and presses against the mouth 23 of the feed pipe 8. The laminated spring 21 may be of very slight thickness and requires only very little movability to move from a closed to an open position, so that the axial extent of the clearance space may be kept very small.

It will be understood that the dimensions of the cylindrical and conical parts 18 and 20, respectively, of the valve plate, the space 19 and the laminated spring 21 depend on the highly variable uses and operating conditions to which the aforesaid regulating valve may be adapted. Moreover in special difficult cases, all of the methods disclosed in the foregoing disclosure may be applied to overcome oscillations of the valve, whereas less complicated cases may be relieved by means of a few of the individual features described. It is therefore understood that the invention protects both the individual embodiments and the combination of the several embodiments described in the foregoing specification.

What I claim and desire to secure by Letters Patent is:

1. In combination, a line adapted to contain fluid under a varying pressure, a main valve in the line to control flow therethrough, said main valve having a flow passage in communication with said line and a seat around said passage, pressure-responsive means comprising a pilot valve connected to respond to the fluid pressure in said line upstream from the main valve and to control actuation of the main valve when the upstream fluid pressure reaches a selected value, said main valve having means defining a cylinder in communication with the outlet of the pilot valve, means providing communication between the outlet of said pilot valve and said main valve cylinder, a piston reciprocable in said cylinder and operable between a first operative position and a second operative position in response to fluid under pressure from the pilot valve, means constantly biasing the piston to the first position, a main valve member operably connected to the piston and operable to a seated position on said seat for closing the main valve passage when said piston is in said first position and operable to an unseated position for opening said passage when the piston is in said second position, a leaf spring one-way valve member disposed in said cylinder to preclude return of the fluid from said cylinder to the pilot valve and rendered effective to isolate the cylinder from the pilot valve when the piston moves in a direction toward the first position subsequent to opening the main valve, means to control fluid flow from the cylinder to the downstream portion of said line to relieve the fluid pressure between the piston and said one-way valve member when the one-way valve is rendered effective to isolate the cylinder from the pilot valve thereby to control the movement of said main valve member to the unseated and seated positions without oscillations thereof.

2. In combination, a line adapted to contain fluid under a varying pressure, a main valve in the line to control flow therethrough, said main valve having a flow passage in communication with said line and a seat around said passage, pressure-responsive means comprising a pilot valve connected to respond to the fluid pressure in said line upstream from the main valve and to control actuation of the main valve when the upstream fluid pressure reaches a selected value, said main valve having means defining a cylinder in communication with the outlet of the pilot valve, means providing communication between the outlet of said pilot valve and said main valve cylinder, a piston reciprocable in said cylinder and operable between a first operative position and a second operative position in response to fluid under pressure from the pilot valve, means constantly biasing the piston to the first position, a main valve member operably connected to the piston and operable to a seated position on said seat for closing the main valve passage when said piston is in said first position and operable to an unseated position for opening said passage when the piston is in said second position, a leaf spring one-way valve member disposed in said cylinder to preclude return of the fluid from said cylinder to the pilot valve and rendered effective to isolate the cylinder from the pilot valve when the piston moves in a direction toward the first position subsequent to opening the main valve, means defining a bleeder port to control fluid flow from the cylinder to the downstream portion of said line to relieve the fluid pressure between the piston and said one-way valve member when the one-way valve is rendered effective to isolate the cylinder from the pilot valve thereby to control the movement of said main valve member to the unseated and seated positions without oscillations thereof.

3. In combination, a line adapted to contain fluid under a varying pressure, a main valve in the line to control flow therethrough, a tubular member in said main valve defining a flow passage in communication with said line and a seat around said passage, pressure-responsive means comprising a pilot valve connected to respond to the fluid pressure in said line upstream from the main valve and to control actuation of the main valve when the upstream fluid pressure reaches a selected value, said main valve having means defining a cylinder in communication with the outlet of the pilot valve, means providing communication between the outlet of said pilot valve and said main valve cylinder, a piston reciprocable in said cylinder and operable between a first operative position and a second operative position in response to fluid under pressure from the pilot valve, means constantly biasing the piston to the first position, a main valve member operably connected to the piston and operable to a seated position on said seat for closing the main valve passage when said piston is in said first position and operable to an unseated position for opening said passage when the piston is in said second position, a leaf spring one-way valve member disposed in said cylinder to preclude return of the fluid from said cylinder to the pilot valve and rendered effective to isolate the cylinder from the pilot valve when the piston moves in a direction toward the first position subsequent to opening the main valve, means to control fluid flow from the cylinder to the downstream portion of said line to relieve the fluid pressure between the piston and said one-way valve member when the one-way valve is rendered effective to isolate the cylinder from the pilot valve thereby to control the movement of said main valve member to the unseated and seated positions without oscillations thereof, means cooperating with the one-way valve member and said fluid flow control means to control the movement of said main valve member comprising means on said main valve member extending axially into said tubular member a selected distance when the main valve is closed and radially spaced from the inner walls of the tubular member a selected distance.

References Cited in the file of this patent
UNITED STATES PATENTS

| | | |
|---|---|---|
| 270,573 | Blake | Jan. 16, 1883 |
| 727,039 | Westinghouse | May 5, 1903 |
| 1,325,508 | Cockburn et al. | Dec. 23, 1919 |
| 2,013,665 | Messier | Sept. 10, 1935 |
| 2,401,144 | Dube | May 28, 1946 |